United States Patent
Whitlock

(10) Patent No.: US 10,065,547 B2
(45) Date of Patent: Sep. 4, 2018

(54) ARMREST SUPPORT BRIDGE

(71) Applicant: FORD GLOBAL TECHNOLOGIES, LLC, Dearborn, MI (US)

(72) Inventor: Michael Whitlock, Farmington Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/271,263

(22) Filed: Sep. 21, 2016

(65) Prior Publication Data
US 2018/0079337 A1    Mar. 22, 2018

(51) Int. Cl.
  *B60N 2/42*    (2006.01)
  *B60N 2/427*    (2006.01)
  *B60N 2/75*    (2018.01)

(52) U.S. Cl.
  CPC ............ *B60N 2/78* (2018.02); *B60N 2/4235* (2013.01); *B60N 2/42709* (2013.01)

(58) Field of Classification Search
  CPC ... B60N 2/466; B60N 2/4235; B60N 2/42709
  USPC ........................................ 296/153
  See application file for complete search history.

(56) References Cited

U.S. PATENT DOCUMENTS

| 5,445,430 | A | 8/1995 | Nichols |
| 5,527,084 | A | 6/1996 | Scherf |
| 6,568,743 | B1 * | 5/2003 | Jayasuriya ......... B60N 2/42727 296/153 |
| 7,503,621 | B2 | 3/2009 | Mani |
| 7,794,008 | B2 | 9/2010 | Hall et al. |
| 8,157,309 | B2 * | 4/2012 | Ishikawa ................. B60N 2/46 188/377 |
| 2015/0165942 | A1 | 6/2015 | Laird et al. |

FOREIGN PATENT DOCUMENTS

| DE | 102008053232 A1 | 7/2010 |
| KR | 20110058298 A | 6/2011 |

OTHER PUBLICATIONS

Eglish Machine Translation of DE102008053232A1.
English Machine Translation of KR20110058298A.

* cited by examiner

*Primary Examiner* — Joseph D. Pape
*Assistant Examiner* — Dana D Ivey
(74) *Attorney, Agent, or Firm* — Vichit Chea; King & Schickli PLLC

(57) ABSTRACT

An armrest assembly for a vehicle includes an armrest substrate having a vehicle-outboard substrate member, a vehicle-inboard substrate member, and at least one end member holding the vehicle-outboard substrate member and the vehicle-inboard substrate member at a spaced distance from one another. At least one support bridge member is disposed laterally across the spaced distance. The vehicle-outboard substrate member holds an end of the at least one support bridge member without imposing an outboard restriction on the at least one support bridge member. The armrest assembly may further include a fabric member attached to the armrest substrate, a cushion member extending over the fabric member, and a cover member extending over the cushion member, the fabric member, and the armrest substrate.

19 Claims, 4 Drawing Sheets

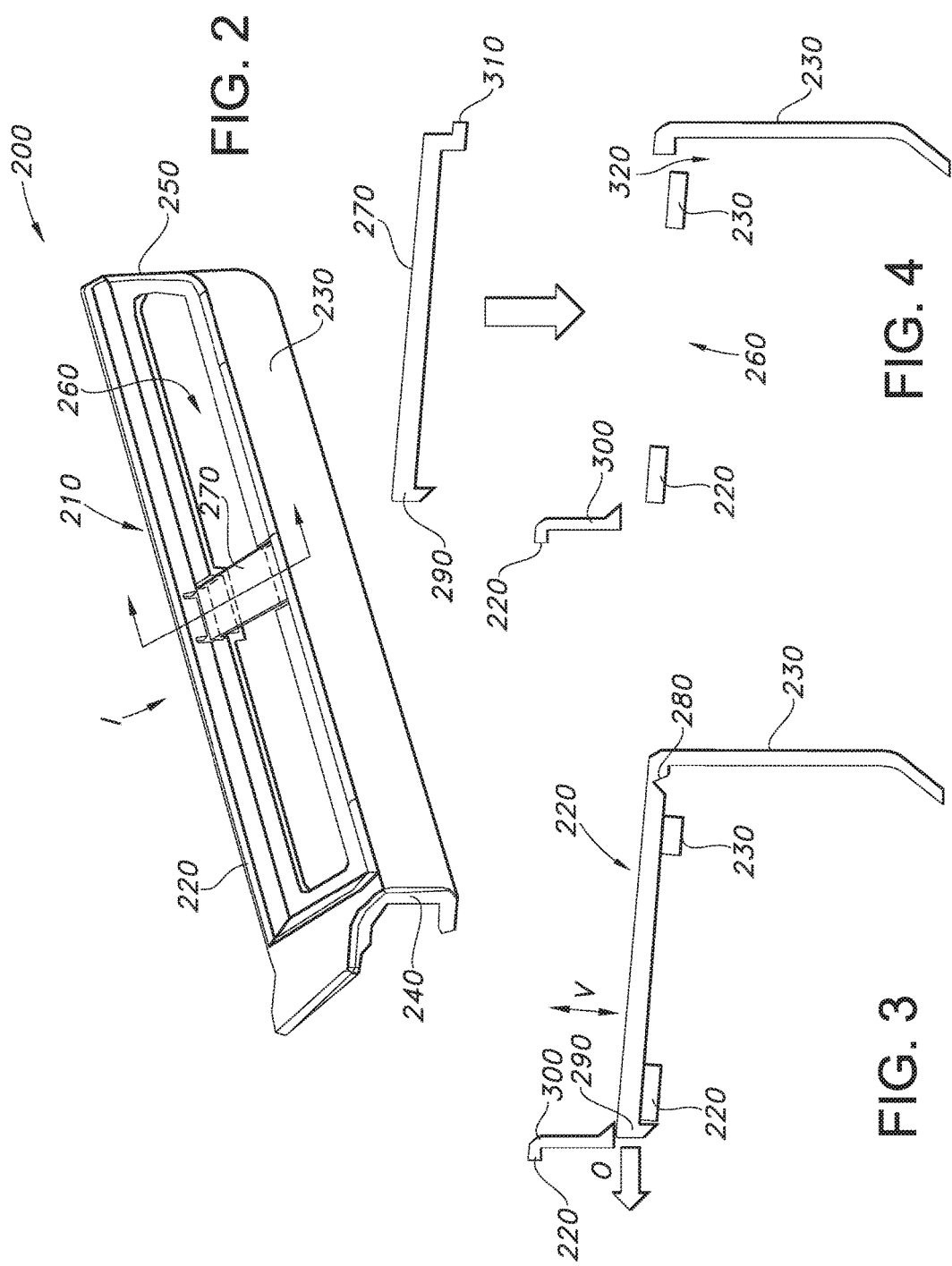

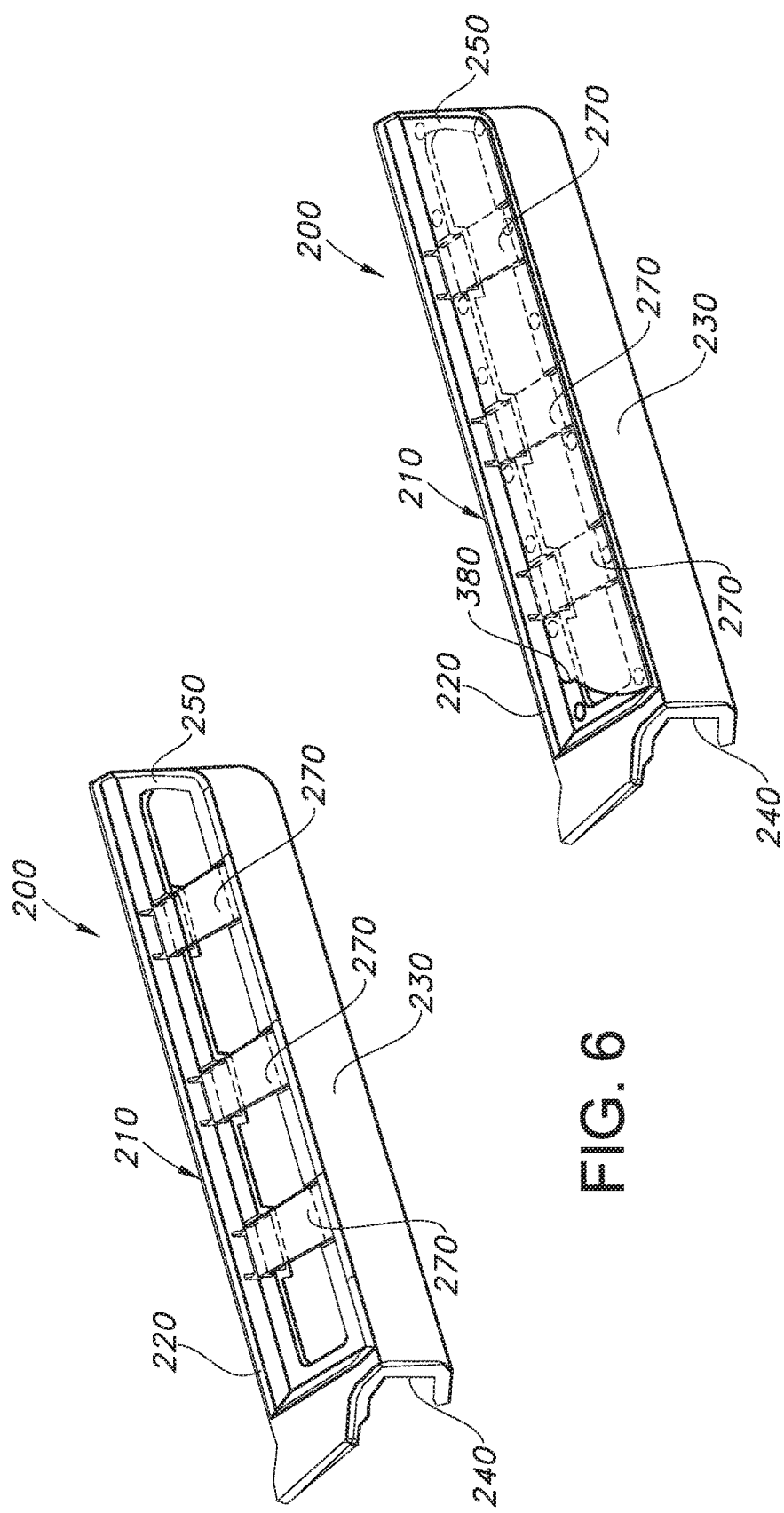

ARMREST SUPPORT BRIDGE

TECHNICAL FIELD

This disclosure relates generally to armrests for vehicle doors. More particularly, the disclosure relates to a substrate for a vehicle door-mounted armrest having a displaceable support bridge member.

BACKGROUND

A conventional armrest assembly 100 as shown in FIG. 1 includes an armrest substrate 110 having a vehicle-inward member 120 and a vehicle-outward member 130. Because it is a requirement that door armrest assemblies 100 collapse horizontally upon receipt of a side impact, a gap 140 is defined between the vehicle-inward member 120 and the vehicle-outward member 130.

However, the armrest assembly must also provide vertical support, i.e. support vertical loads, for functional use. For this reason, additional components are included such as a molded carrier 150 attached to the substrate 110, which may have a fabric layer 160 attached thereto. The molded carrier 150 provides a structural support for supporting vertical loads. The fabric layer 160 is typically attached by stitching, although other methods such as sonic welding, adhesives, etc. are also known. Additional components may include a foam layer 170, and a natural or synthetic material cover 180.

The attachment of the separate molded carrier 150/fabric layer 160 represents significant additional material, tooling, and labor costs for a vehicle manufacturer. To solve this and other problems, the present disclosure relates to an armrest substrate including a displaceable bridge member, allowing the manufacturer to dispense with a separate molded carrier 150 as describe above while still providing a needed function of vertical support for an armrest assembly.

SUMMARY

In accordance with the purposes and benefits described herein, in one aspect an armrest substrate assembly for a vehicle is described, comprising a first substrate member, a second substrate member, and at least one end member holding the first substrate member and second substrate member at a spaced distance from one another. At least one support bridge member is provided, disposed laterally across the spaced distance. In embodiments, a plurality of support bridge members is provided. The at least one support bridge member includes a first end having a snap element. A one of the first substrate member and the second substrate member includes a snap fit feature for capturing the snap element.

In embodiments, a second end of the at least one support bridge member is releasably attached to a one of the first substrate member and the second substrate member. The second end may include a tab for engaging a cooperating slot in a one of the first substrate member and the second substrate member. In alternative embodiments, a second end of the at least one support bridge member is hingedly attached to a one of the first substrate member and the second substrate member. In one possible embodiment, the second end is hingedly attached to the one of the first substrate member and the second substrate member by a living hinge.

In another aspect of the disclosure, an armrest assembly for a vehicle, comprising an armrest substrate comprising a vehicle-outboard substrate member, a vehicle-inboard substrate member, and at least one end member holding the vehicle-outboard substrate member and the vehicle-inboard substrate member at a spaced distance from one another. At least one support bridge member is provided disposed laterally across the spaced distance, the at least one support bridge member including a snap element portion. In embodiments, a plurality of support bridge members is provided. The vehicle-outboard substrate member may include a snap fit feature for capturing the snap element portion without imposing an outboard restriction on the at least one support bridge member.

In an embodiment, the vehicle-inboard substrate member includes a slot for releasably engaging a tab portion of the at least one support bridge member. In an alternative embodiment, the vehicle-inboard substrate member is hingedly attached to a portion of the at least one support bridge member. In one possible embodiment, the at least one support bridge member is hingedly attached to the vehicle-inboard substrate member by a living hinge. The armrest assembly may further include a fabric member attached to the armrest substrate, a cushion member extending over the fabric member, and a cover member extending over the cushion member, the fabric member, and the armrest substrate.

In the following description, there are shown and described embodiments of the disclosed armrest substrate and armrest assemblies incorporating same. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed armrest substrate and armrest assemblies incorporating same, and together with the description serve to explain certain principles thereof. In the drawing:

FIG. 2 depicts a vehicle armrest substrate according to the present disclosure;

FIG. 3 depicts a side cross-sectional view of the armrest substrate of FIG. 2;

FIG. 4 depicts a side cross-sectional view of an alternative embodiment of the armrest substrate of FIG. 2;

FIG. 6 depicts an alternative embodiment of the vehicle armrest substrate of FIG. 2; and FIG. 7 depicts the vehicle armrest substrate of FIG. 6, provided with a fabric covering.

Figure 1:
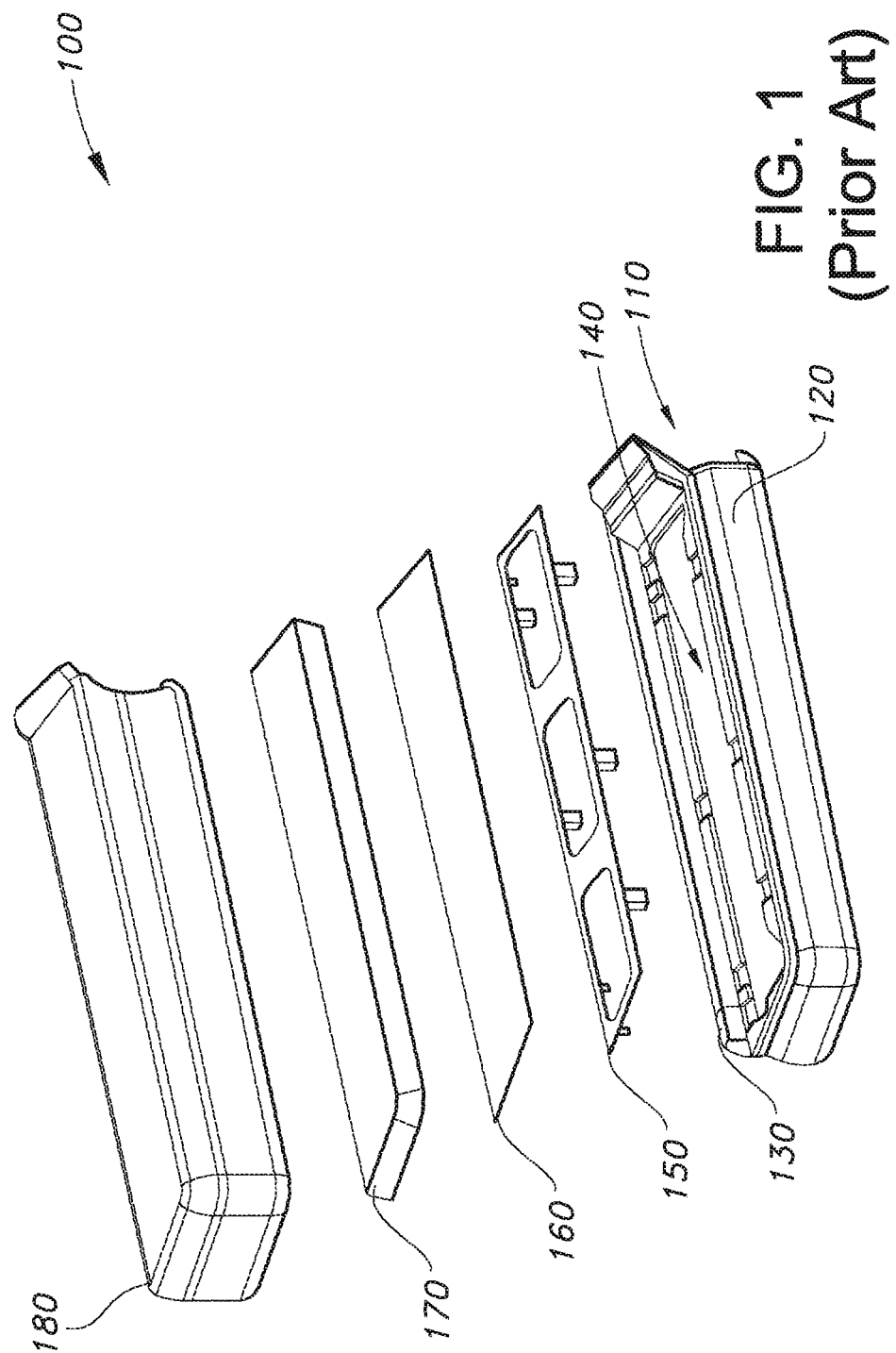
FIG. 1 depicts a vehicle including a prior art armrest assembly.

Reference will now be made in detail to embodiments of the disclosed armrest substrate, examples of which are illustrated in the accompanying drawing figures.

DETAILED DESCRIPTION

With reference to FIG. 2, a vehicle armrest substrate 200 includes a body 210 having an outboard substrate member 220 and an inboard substrate member 230. As the skilled artisan will appreciate, the terms "outboard" and "inboard" refer to the positioning of the substrate members when attached to a vehicle door assembly (not shown in this view). End pieces 240, 250 hold the outboard substrate member 220 and the inboard substrate member 230 in a spaced-apart relationship, defining a gap 260 therebetween. As the skilled artisan will also appreciate, the gap 260 allows the vehicle armrest substrate 200 to collapse or compress horizontally upon receipt of a side impact (see arrow I).

At least one displaceable support bridge member 270 is provided, extending laterally across the gap 260. As will be understood, this displaceable support bridge member 270, when in place as shown in the drawing figure, provides vertical support/supports vertical loads, for functional use of an armrest incorporating the armrest substrate 200. To ensure that the vehicle armrest substrate 200 retains the above-described function of collapsing/compressing horizontally on receipt of a side impact, the displaceable support bridge member 270 is releasably attached to the outboard substrate member 220.

In one embodiment, with reference to FIG. 3 a first end of the displaceable support bridge member 270 is hingedly connected to a portion of the inboard substrate member 230. In the depicted embodiment, the displaceable support bridge member 270 is hingedly connected to a portion of the inboard substrate member 230 by a living hinge 280, although any suitable hinge mechanism is contemplated. Advantageously, use of a living hinge 280 allows the displaceable support bridge member 270 to be fabricated as a portion of the armrest substrate 200, for example by molding the substrate as a single piece.

A second end of the displaceable support bridge member 270 includes a snap element 290. In the depicted embodiment the second end of the displaceable support bridge member 270 is configured as a cantilever snap arm. A flexible snap leg 300 is provided as a portion of the outboard substrate member 220, dimensioned and configured to engage the snap fit element 290 in a snap fit. As shown, while the displaceable support bridge member 270 is held in place and substantially prevented from vertical movement (arrow V), no restriction is imposed on the ability of the displaceable support bridge member to move laterally in an outboard direction (arrow O) relative to the outboard substrate member 220. It will be appreciated that alternative snap fit elements are contemplated, with the caveat that no outboard restriction to movement of the displaceable support bridge member 270 is imposed.

In an alternative embodiment shown in FIG. 4, the displaceable support bridge member 270 is releasably engaged by the inboard substrate member 230, such as by a tab 310 engaged by a cooperating slot 320. Again, as described above while the displaceable support bridge member 270 is held in place and substantially prevented from vertical movement no restriction is imposed on the ability of the displaceable support bridge member to move laterally in an outboard direction relative to the outboard substrate member 220.

Figure 5B:
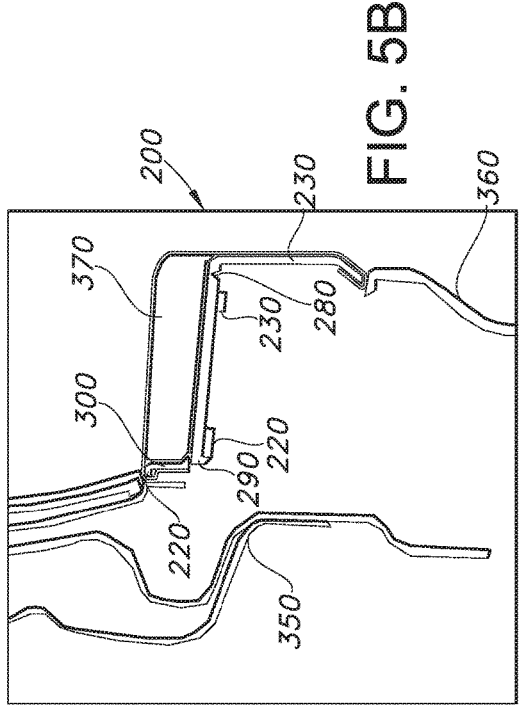
FIG. 5B depicts the vehicle armrest substrate of FIG. 5A prior to a side impact.
Figure 5C:
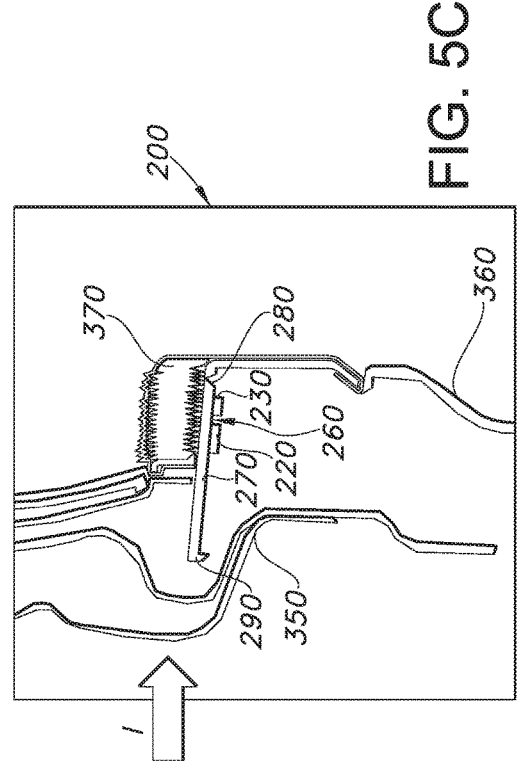
FIG. 5C depicts the vehicle armrest substrate of FIG. 5A after a side impact.
Figure 5A:
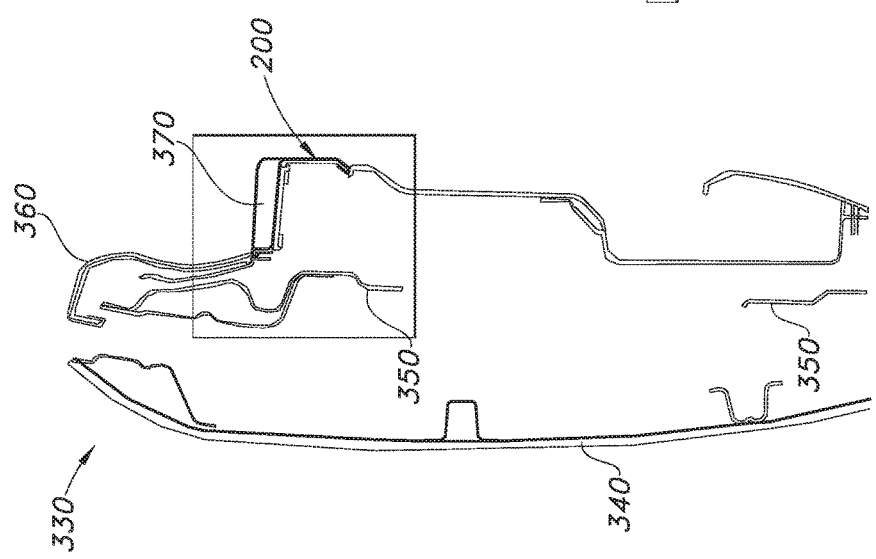
FIG. 5A depicts a cross-sectional view of a vehicle door assembly including the vehicle armrest substrate according to the present disclosure.

FIG. 5A shows a vehicle door assembly 330 including the vehicle armrest substrate 200 described above. The door assembly 330 includes an exterior sheet metal panel 340, an interior sheet metal panel 350, and a trim panel 360 attached to the interior sheet metal panel. The vehicle armrest substrate 200 is attached to an upper portion of the trim panel 360, and has a cushion member 370 extending thereabove.

FIG. 5B shows the vehicle armrest substrate 200 attached to the door assembly 330 in isolation prior to a side impact I. In this configuration, the displaceable support bridge member 270 supports vertical loads in combination with the cushion member 370. As shown in FIG. 5C, on receipt of a side impact I, the armrest substrate 200 collapses/compresses, i.e. the outboard substrate member 220 and the inboard substrate member 230 are forced closer to one another and the gap 260 decreases in width. Likewise, the cushion member 370 is collapsed/compressed. By the above-described connections between the displaceable support bridge member 270 and the outboard substrate member 220 and the inboard substrate member 230, the displaceable support bridge member 270 releases from the outboard substrate member 220 in an outboard direction, and thereby does not interfere with the collapsing/compression of the armrest substrate 200.

It will be appreciated that numerous advantages accrue to the described armrest substrate 200. By use of the armrest substrate 200, piece costs and tooling costs associated with providing a separate carrier as shown in FIG. 1 are eliminated. Likewise, the cost of attaching a fabric to the carrier such as by sewing are eliminated. If required, a fabric can be directly attached to the armrest substrate 200 such as by sonic welding. Whether the described displaceable bridge support member 270 is fabricated as part of or separate from the armrest substrate 200, it can be made as a part of the armrest substrate tooling, further reducing manufacturing costs.

Obvious modifications and variations are possible in light of the above teachings. For example, a plurality of displaceable support bridge members 270 may be provided (see FIG. 6). Likewise, as described a fabric covering 380 for the armrest substrate 200 may be included (see FIG. 7). All such modifications and variations are within the scope of the appended claims when interpreted in accordance with the breadth to which they are fairly, legally and equitably entitled.

What is claimed:

1. An armrest substrate assembly for a vehicle, comprising:
    a first substrate member, a second substrate member, and at least one end member holding the first substrate member and second substrate member at a spaced distance from one another; and
    at least one linearly displaceable support bridge member disposed laterally across the spaced distance;
    wherein the support bridge member includes a first end having a snap element.

2. The armrest substrate assembly of claim 1, comprising a plurality of support bridge members.

3. The armrest substrate assembly of claim 1, wherein a one of the first substrate member and the second substrate member includes a snap fit feature for capturing the snap element.

4. The armrest substrate assembly of claim 1, wherein a second end of the at least one support bridge member is releasably attached to a one of the first substrate member and the second substrate member.

5. The armrest substrate assembly of claim 4, wherein the second end includes a tab for engaging a cooperating slot in a one of the first substrate member and the second substrate member.

6. The armrest substrate assembly of claim 1, wherein a second end of the at least one support bridge member is hingedly attached to a one of the first substrate member and the second substrate member.

7. The armrest substrate assembly of claim 6, wherein the second end is hingedly attached to the one of the first substrate member and the second substrate member by a living hinge.

8. A door assembly including the armrest substrate assembly of claim 1.

9. A vehicle including the door assembly of claim 8.

10. An armrest assembly for a vehicle, comprising:
an armrest substrate comprising a vehicle-outboard substrate member, a vehicle-inboard substrate member, and at least one end member holding the vehicle-outboard substrate member and the vehicle-inboard substrate member at a spaced distance from one another; and
at least one linearly displaceable support bridge member disposed laterally across the spaced distance, the at least one support bridge member including a snap element portion.

11. The armrest assembly of claim 10, comprising a plurality of support bridge members.

12. The armrest assembly of claim 10, wherein the vehicle-outboard substrate member includes a snap fit feature for capturing the snap element portion without imposing an outboard restriction on the at least one support bridge member.

13. The armrest assembly of claim 12, wherein the vehicle-inboard substrate member includes a slot for releasably engaging a tab portion of the at least one support bridge member.

14. The armrest assembly of claim 12, wherein the vehicle-inboard substrate member is hingedly attached to a portion of the at least one support bridge member.

15. The armrest assembly of claim 14, wherein the at least one support bridge member is hingedly attached to the vehicle-inboard substrate member by a living hinge.

16. The armrest assembly of claim 10, further including a fabric member attached to the armrest substrate.

17. The armrest assembly of claim 16, further including a cushion member extending over the fabric member and a cover member extending over the cushion member, the fabric member, and the armrest substrate.

18. A door assembly including the armrest assembly of claim 10.

19. A vehicle including the door assembly of claim 18.

* * * * *